(12) United States Patent
Crossman

(10) Patent No.: US 8,863,599 B2
(45) Date of Patent: Oct. 21, 2014

(54) YOKE ASSEMBLY FOR POWER STEERING RACK AND PINION GEAR SET

(75) Inventor: John Crossman, Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 420 days.

(21) Appl. No.: 13/291,382

(22) Filed: Nov. 8, 2011

(65) Prior Publication Data

US 2013/0112024 A1    May 9, 2013

(51) Int. Cl.
*F16H 1/04* (2006.01)
*F16H 55/18* (2006.01)
*F16H 35/00* (2006.01)
*B62D 3/12* (2006.01)
*F16H 55/28* (2006.01)

(52) U.S. Cl.
CPC .............. *B62D 3/123* (2013.01); *F16H 55/283* (2013.01)
USPC ............................ 74/422; 74/409; 74/388 PS

(58) Field of Classification Search
USPC ....... 74/89.14, 109, 388 R, 388 PS, 409, 410, 74/411, 422, 498, 500; 267/81, 151, 158, 267/160, 161, 164, 245; 29/527.2; 384/192, 384/202, 224, 276, 300, 582; 464/84
See application file for complete search history.

(56) References Cited

U.S. PATENT DOCUMENTS

| | | | | |
|---|---|---|---|---|
| 4,016,774 A | * | 4/1977 | Baker et al. | 74/424.6 |
| 4,619,155 A | * | 10/1986 | Futaba | 74/498 |
| 5,906,138 A | * | 5/1999 | Kostrzewa | 74/498 |
| 5,931,046 A | * | 8/1999 | Phillips | 74/422 |
| 6,119,540 A | * | 9/2000 | Phillips | 74/422 |
| 6,178,843 B1 | * | 1/2001 | Machida et al. | 74/498 |
| 6,247,375 B1 | * | 6/2001 | Gierc et al. | 74/388 PS |
| 6,427,552 B1 | * | 8/2002 | Sahr | 74/422 |
| 7,604,088 B2 | | 10/2009 | Nishizaki et al. | |
| 8,555,741 B2 | * | 10/2013 | Arlt et al. | 74/388 PS |
| 2002/0085778 A1 | * | 7/2002 | Mena | 384/276 |
| 2004/0250640 A1 | * | 12/2004 | Robertson et al. | 74/422 |
| 2005/0039560 A1 | * | 2/2005 | Degorce et al. | 74/422 |
| 2007/0163375 A1 | * | 7/2007 | Counts | 74/422 |
| 2007/0209463 A1 | * | 9/2007 | Song et al. | 74/388 PS |
| 2008/0184830 A1 | | 8/2008 | Arlt | |

* cited by examiner

*Primary Examiner* — Troy Chambers
*Assistant Examiner* — Jake Cook
(74) *Attorney, Agent, or Firm* — Raymond L. Coppiellie; Brooks Kushman P.C.

(57) ABSTRACT

A power steering apparatus including a rack gear and a pinion gear that are disposed within a housing and preloaded by a yoke assembly. The yoke assembly includes a bushing that is biased into engagement with the rack. A yoke plug extends through a yoke opening to provide a gear mesh load on the rack through the bushing assembly. The yoke body is axially assembled through a rack gear bore in the housing of the steering gear and a yoke assembly is inserted through a yoke bore to apply mesh preload to the bushing assembly. A method of making the yoke assembly by forming leaf springs that are over-molded to form a yoke body.

4 Claims, 3 Drawing Sheets

YOKE ASSEMBLY FOR POWER STEERING RACK AND PINION GEAR SET

TECHNICAL FIELD

This development relates to a yoke assembly that applies a preload and mesh load to a rack and pinion steering gear assembly.

BACKGROUND

A steering gear assembly converts turning motions applied to the steering wheel through the steering column to transverse lateral movement of a rack gear. The steering gear assembly may include a rack and a pinion gear that cooperate to turn the front wheels of a vehicle to steer the vehicle. The steering gear assembly is subject to shocks and application of loads from the front tires and wheels. Impacts may cause the rack and pinion gear to disengage in extreme conditions if they are not held in place. A yoke assembly may be provided to hold the rack and pinion gear together.

The yoke assembly contacts the rack gear at a diametrically opposed location relative to the pinion gear. Normally, line contact is provided between the yoke and the rack gear that is less than optimal for friction and wear. A large diameter opening in the steering gear housing must be provided to permit the yoke to be assembled to the housing. Access to the yoke is required to adjust or assemble the yoke to the housing. The large diameter of the yoke and the size of the opening in the housing for the yoke results in difficulty in conveniently locating the assembly to fit in the front end of the vehicle.

The apparatus and methods disclosed in the description of the illustrated embodiment and as summarized below address the above problems and other problems that will be apparent to one of ordinary skill in the art that relate to the subject matter of this disclosure.

SUMMARY

A power steering apparatus for a vehicle is disclosed that comprises: a housing that defines a bore that extends in the transverse vehicle direction; a rack gear disposed in the bore in the housing; a pinion gear disposed in the housing that operatively engages the rack gear within the bore to drive the rack gear reciprocally within the housing; and a yoke assembly. The yoke assembly includes a bushing disposed in the bore that preloads the rack and is biased into engagement with the rack. A yoke plug extends through a yoke opening in the housing and applies a gear mesh load to the rack gear. The bushing has a first spring rate that corresponds to the bushing preload. The bushing is also biased toward the rack gear by a yoke plug spring that has a second spring rate that is greater than the first spring rate. The yoke plug is operative to restrain the rack gear from disengaging the pinion gear.

According to other aspects of the apparatus, the bushing further comprises a spring body that is engaged by the yoke plug and a bushing layer disposed between the spring body and the rack gear. The spring body may be a spring steel member that is over-molded with a polymeric layer. The spring steel member extends about the rack gear between the rack gear and the housing and supports the bushing as the bushing is biased by the spring body. The bushing may be a low friction polymer that is bonded to the polymeric layer over-molded on the spring steel member. The spring steel member may be a unitary body having a plurality of positioning guide rails that are connected by integrally formed living hinges. The positioning guide rails may be leaf springs. The bushing may be larger than the yoke opening and may be retained within the bore by a portion of an inner surface of the housing and the yoke plug.

A method of assembling a yoke assembly to a steering gear set is also disclosed. The steering gear set used in the method includes a housing defining a housing bore, a yoke opening and a pinion gear opening that intersects the housing bore. A rack gear is disposed within the housing bore and a pinion gear is assembled to the housing through the pinion gear opening that operatively engages the rack gear. The method comprises inserting a bushing axially into the housing bore with the rack gear. The bushing is aligned with the yoke opening on a diametrically opposite side of the rack gear from the pinion gear opening. The pinion gear is inserted through the pinion gear opening to engage the rack gear. A yoke plug is assembled into the yoke opening to bear upon the bushing and maintain the rack gear in engagement with the pinion gear.

According to other aspects of the method, the method may further comprise the steps of selecting a spring member and assembling a bushing layer to the spring member to form the bushing before the bushing is inserted into the housing bore.

A method of making a yoke assembly for a power steering apparatus for a vehicle is also disclosed. The method comprises the steps of forming a preload spring body and attaching a bushing layer to the preload spring body to form a bushing assembly. Selecting a yoke plug and assembling a mesh load spring to the yoke plug to form a yoke assembly. Inserting the bushing assembly axially into the housing bore and aligning the bushing assembly with a yoke opening on a diametrically opposite side of the rack gear from a pinion gear opening. The pinion gear is inserted through the pinion gear opening to engage the rack gear. The yoke assembly is assembled into the yoke opening to bear upon the bushing assembly and maintain the rack gear in engagement with the pinion gear.

According to other aspects of the method of making a yoke assembly, the method may further comprise stamping a one piece leaf spring body and over-molding the one piece spring body with a polymeric layer. The bushing layer is attached to the preload spring body to form the bushing assembly and may further include bonding the bushing layer to the leaf spring body. The step of attaching the bushing layer to the preload spring body may include bending the preload spring body to hold the bushing in a semi-cylindrical shape. The method may further comprise trimming web portions of the one piece spring body after the over-molding step.

These and other aspects of disclosure will be better understood in view of the attached drawings and the following detailed description of the illustrated embodiment of the steering gear apparatus and the methods of assembling and manufacturing the yoke assembly of the steering gear assembly.

DETAILED DESCRIPTION

A detailed description of the illustrated embodiments of the present invention are provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
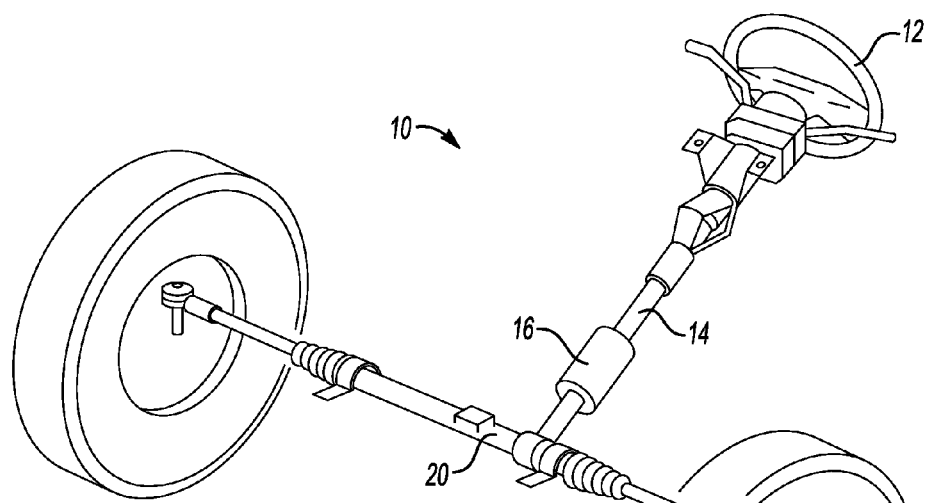
FIG. 1 is a perspective view of a steering column, steering gear, housing and steering links to a pair of a front wheel and tire assemblies.

Referring to FIG. 1, a power steering system is generally indicated by reference numeral 10. A steering wheel 12 is connected to a steering column 14 that is provided with an electronic power steering (EPS) manual steering gear system 16. The EPS manual steering gear system is operatively connected to a steering gear housing 20.

Figure 2:
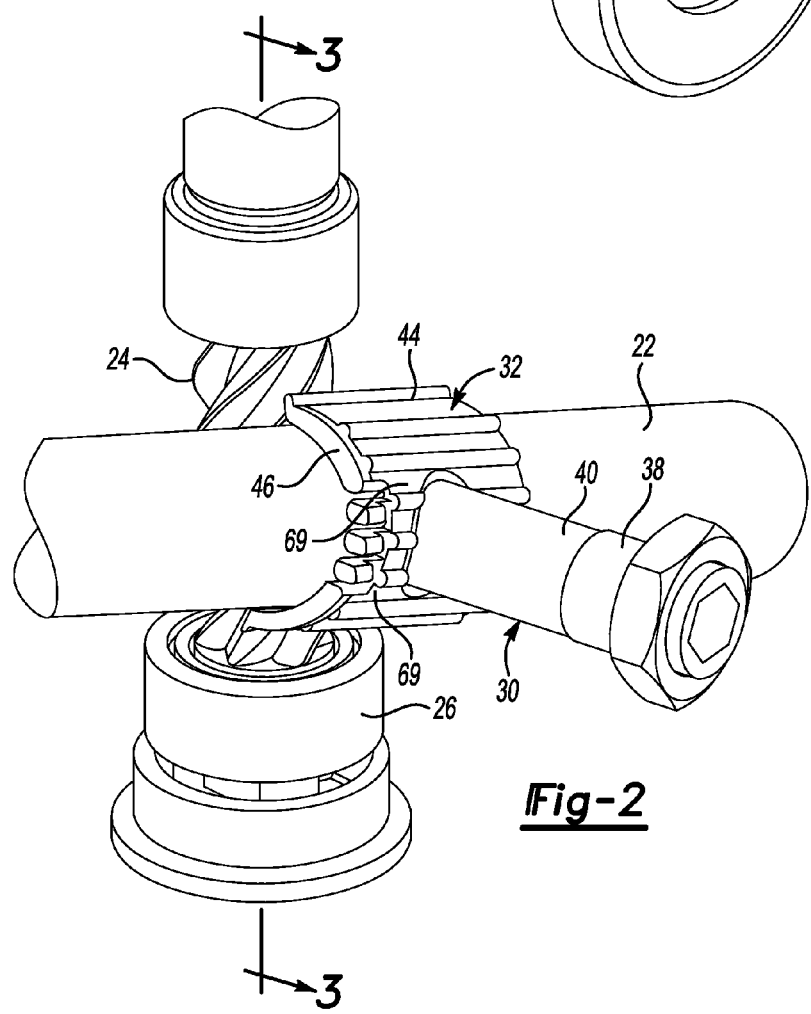
FIG. 2 is a fragmentary perspective of a rack and pinion steering gear and a yoke assembly.

Referring to FIG. 2, a portion of the EPS manual steering gear system 16 is shown with the steering gear housing 20 (shown in FIG. 1) removed. A rack gear 22 is engaged by a pinion gear 24. The pinion gear 24 is received on its distal end in a pinion gear end bearing 26. A yoke assembly is generally indicated by reference numeral 30. The yoke assembly 30 engages a bushing assembly generally indicated by reference numeral 32. The yoke assembly includes an adjustment shaft 38 and a bushing interface shaft 40. The bushing assembly 32 includes a yoke body 44 that supports a sliding bushing 46. The yoke body 44 is engaged by the bushing interface shaft 40. The bushing interface shaft 40 applies a mesh preload force to the yoke body 44. The yoke body 44 applies a bushing preload to the sliding bushing 46. The bushing preload and mesh preload forces are described below with reference to FIG. 4.

Figure 3:
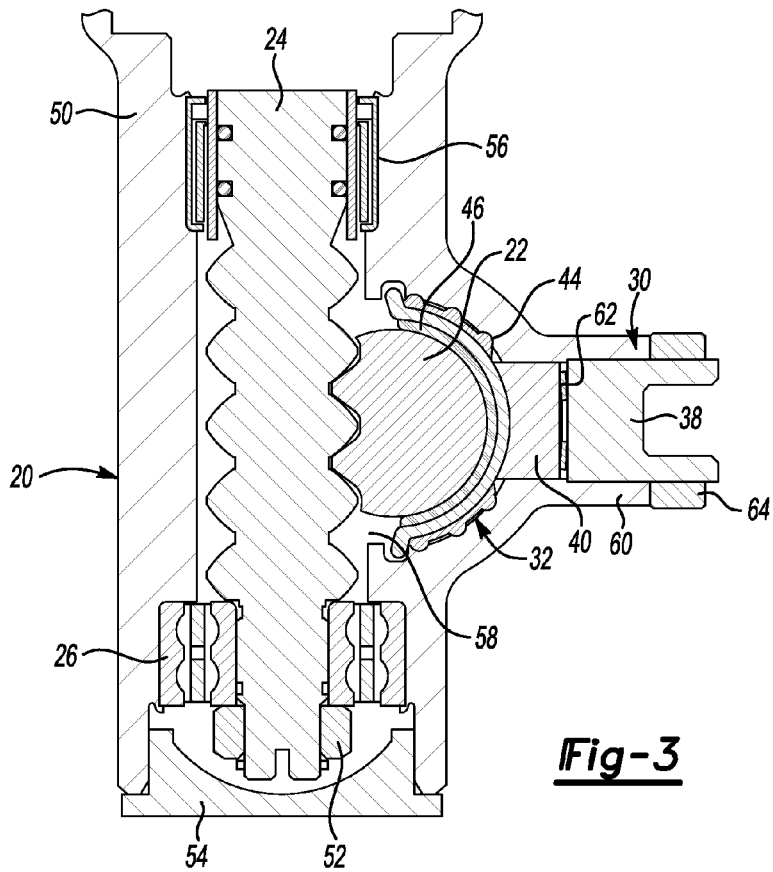
FIG. 3 is a cross-sectional view of the rack and pinion steering gear taken along the line 3-3 in FIG. 2 and also illustrating parts of the housing.

Referring to FIG. 3, the steering gear housing 20 is shown in a cross-section taken through a pinion gear sleeve 50 that defines an opening for the pinion gear 24. This section is also taken through the rack gear 22, yoke assembly 30 and bushing assembly 32. The pinion gear 24 is shown engaging the rack gear 22 with the yoke assembly 30 and bushing assembly 32 supporting the rack gear 22 on the opposite side of the rack gear 22 from its point of engagement with the pinion gear 24. The pinion gear 24 is received at its distal end in the pinion gear end bearing 26. The pinion gear is retained in the pinion gear end bearing 26 by a nut 52. An end cap 54 is attached to the end of the pinion gear sleeve 50. An upper pinion gear bushing 56 is provided on the upper end of the pinion gear sleeve 50 to provide a lubrication seal between the pinion gear 24 and the pinion gear sleeve 50. Lubrication is also contained within the pinion gear sleeve 50 by the end cap 54. The rack gear 22 extends through a rack gear bore 58 that extends through the length of the steering gear housing 20. A yoke sleeve 60 is formed in the steering gear housing 20 that receives the yoke assembly 30. The yoke assembly 30 includes the bushing interface shaft 40 and an adjustment shaft 38. A Belleville washer 62, or spring, is provided between adjustment shaft 38 and the bushing interface shaft 40 to apply a mesh preload spring force to the bushing assembly 32. The force applied by the yoke assembly 30 is adjusted by adjusting a yoke adjustment nut 64 that is used to adjust the position of the adjustment shaft 38 within the yoke sleeve 60.

Figure 4:
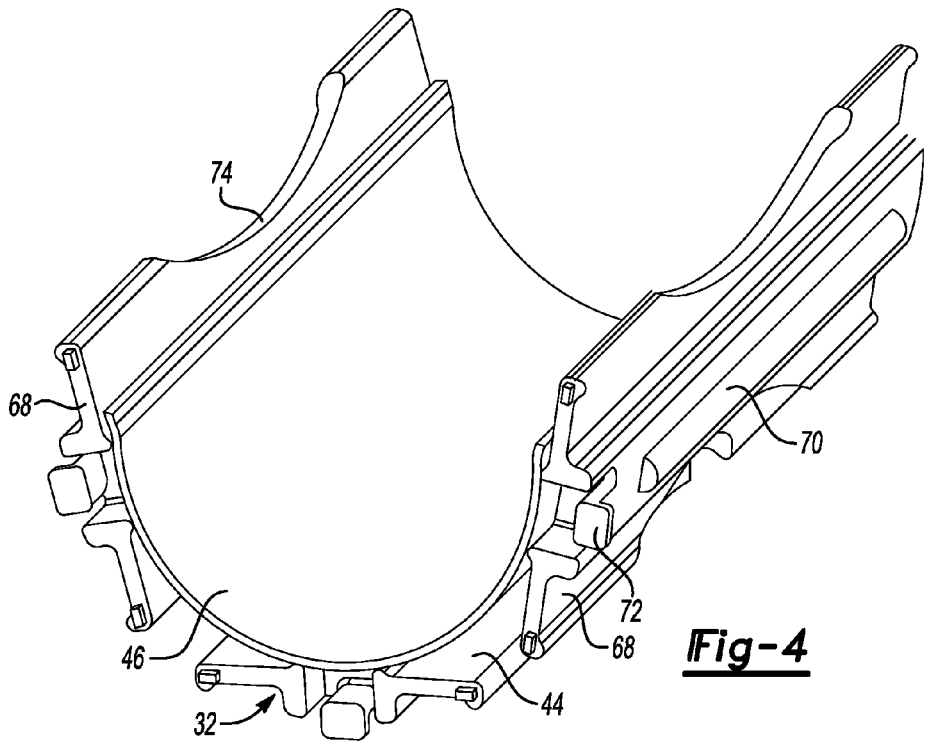
FIG. 4 is a perspective view of the bushing assembly shown in FIGS. 2 and 3.

Referring to FIG. 4, the bushing assembly 32 is shown in isolation. The bushing assembly 32 includes the yoke body 44 and sliding bushing 46. The sliding bushing 46 may be a PTFE member that is supported by the yoke body 44. The yoke body 44 includes a plurality of leaf springs 68 that are formed by a stamping spaced leafs from a spring steel sheet. The spring steel sheet is connected on opposite ends by a web during the manufacturing process. The stamped leafs are then placed in an injection molding die where they are over-molded with a polymeric material, such as Delrin (acetal plastic a thermoplastic polymer manufactured by the polymerization of formaldehyde), that connects the leaf springs together and provides a living hinge 69 (as shown in FIG. 2) between the leaf springs. The web connecting the leaf springs is trimmed to leave the leaf springs connected solely by the Delrin living hinges 69. The sliding bushing 46 is formed as a PTFE substrate. The sliding bushing is then bonded to the yoke body 44. The PTFE substrate may be molded in a semi-cylindrical, or arcuate, shape generally conforming to the shape of the rack gear 22. The yoke body 44 is held by the sliding bushing in a position that generally conforms to the rack gear bore 58 in the steering gear housing 20.

The bushing assembly 32 is assembled into the steering gear housing 20 by inserting the yoke assembly axially through the rack gear bore 58 until it is aligned with the yoke sleeve 60. The yoke assembly 30 (including the bushing interface shaft 40, the Belleville washer 62, and adjustment shaft 38) is inserted through the yoke sleeve 60. The rack gear 22 is inserted into the steering gear housing 20 before the yoke assembly 30 is inserted in the yoke sleeve 60. The bushing assembly 32 may be considerably larger than the diameter of the yoke sleeve 60 and can encompass the rack gear 22 to a greater extent than prior art yoke assemblies because it is inserted axially through the rack gear bore 58. When the bushing assembly 32 is inserted through the rack gear bore 58, an actuator may be used to seat the bushing prior to inserting the pinion into the steering gear housing 20.

Positional interference forces applied to the over-molded leaf 68 by the rack gear bore 58 cause the leaf springs 68 to bend, thereby providing the design intent preload. As the yoke body 44 is inserted in the rack gear bore 58, it is compressed slightly to preload the sliding bushing 46. The design stack up between the bushing outer diameter and the housing inner diameter determines the maximum allowable displacement (i.e., yoke clearance).

Referring to FIG. 4, the leaf springs 68 extend axially relative to the rack gear bore 58. A plurality of anti-rotation ribs 70 may be provided on the outside surface of leaf springs 68 that are received in corresponding grooves formed in the rack gear bore 58 of the steering gear housing 20. The anti-rotation ribs prevent the yoke body 44 and sliding bushing 46 from rotating within the rack gear bore 58. A plurality of axial retention tabs 72 are also provided on the leaf springs 68 that engage locating slots formed in the rack gear bore 58 of the steering gear housing 20. The axial retention tabs 72 facilitate locating the yoke body 44 in the axial direction within the rack gear bore 58. A pair of pinion clearance cut-outs 74 are provided on the yoke body 44 that provide clearance for the pinion gear 22.

Figure 5:
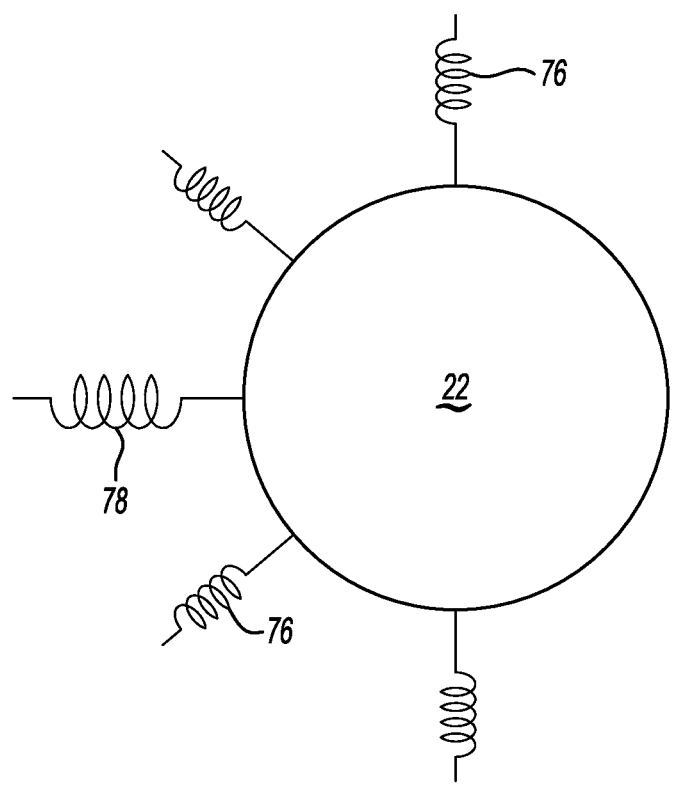
FIG. 5 is a free body diagram of the spring forces applied through the bushing shown in FIGS. 2 and 3.

Referring to FIG. 5, a free body diagram is provided to illustrate the forces applied to the rack gear 22 by the yoke assembly 30 and the bushing assembly 32. The bushing assembly 32 provides an initial preload force 76 of approximately 20% of the total load. The initial preload 76 has low stiffness, is entirely a function of assembly stackup, and is applied at a 30-60° contact angle. The primary preload 78 applies approximately 80% of the load perfectly normal to the rack. This force is adjustable through a threaded plug and lock ring. The primary load is very high stiffness, and is precision adjusted to eliminate any lash in the gearset. All preload forces are applied to the rack through a low friction and low wear sliding bushing contact with the rack. The compliant yoke body conforms the sliding bushing 46 which then conforms to the rack outer diameter creating true surface contact between sliding bushing 46 and rack gear 22.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power steering apparatus comprising:
    a housing defining a bore;
    a rack gear disposed in the bore;
    a pinion gear drives the rack gear;
    a yoke assembly including:
        a bushing having a first spring rate that preloads the rack, wherein the bushing further comprises a spring body that is engaged by the yoke plug and a bushing layer disposed between the spring body and the rack gear, wherein the spring body is a spring steel member that is over-molded with a polymeric layer, the spring steel member extending about the rack gear between the rack gear and the housing and supporting the bushing as the bushing is biased by the spring body, wherein the spring steel member is a unitary body having a plurality of positioning guide rails that are connected by integrally formed living hinges of the over-molded polymeric layer;
        a yoke plug extending through a yoke opening in the housing; and
        a yoke plug spring having a second spring rate that is greater than the first spring rate that applies a gear mesh load through the yoke plug.

2. The apparatus of claim 1 wherein the bushing is a low friction polymer that is bonded to the polymeric layer over-molded on the spring steel member.

3. The apparatus of claim 1 wherein the positioning guide rails are leaf springs.

4. The apparatus of claim 1 wherein the bushing is larger than the yoke opening and is retained within the bore by a portion of an inner surface of the housing and the yoke plug.

\* \* \* \* \*